INVENTOR
ARWED VON KOCH

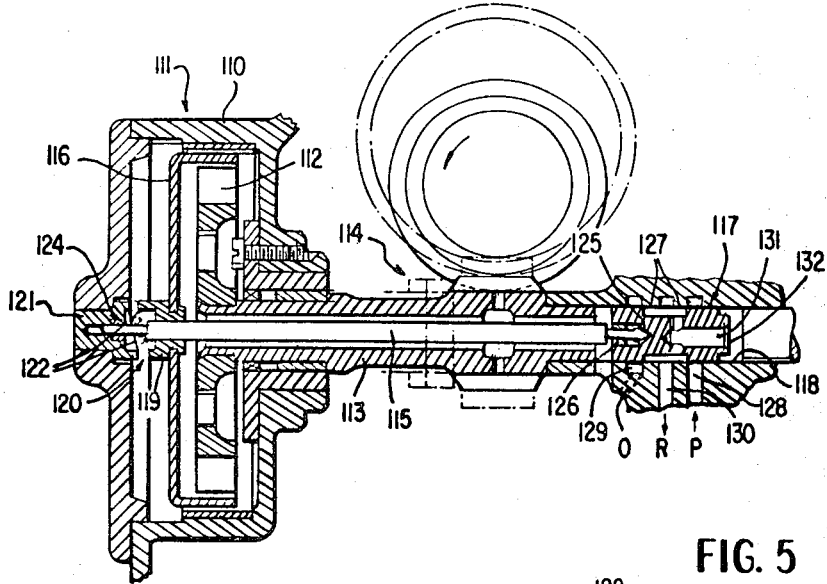
FIG. 4
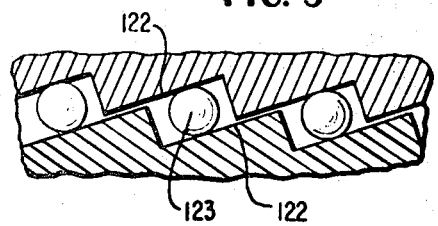
FIG. 5
FIG. 6

United States Patent Office 3,419,027
Patented Dec. 31, 1968

3,419,027
SPEED RESPONSIVE PRESSURE CONTROL
DEVICE
Arwed von Koch, Stuttgart-Sonnenberg, Germany, assignor to Daimler-Benz Aktiengesellschaft, Stuttgart-Unterturkheim, Germany
Filed Feb. 15, 1965, Ser. No. 432,626
Claims priority, application Germany, Feb. 20, 1964, D 43,683
16 Claims. (Cl. 137—47)

ABSTRACT OF THE DISCLOSURE

A pressure control slide valve assembly, especially for automatically-shifted motor vehicle transmissions, for producing a controlled pressure which varies linearly with the rotational speed, including a slide valve having a throttling surface, wherein the slide valve is acted upon by the control pressure itself and by a force which varies with the rotational speed, the latter being in the form of a torque of an eddy-current system, adjustable spring force provided to act in the same direction as the eddy-current induced torque to produce a minimum pressure at the slide valve or acting in a direction opposite to the torque to assure a response only above a minimum rotational speed, wherein the slide valve member itself or a sleeve surrounding the same is adapted to rotate and means are provided for converting the rotational movement imparted by the input into axial movement of a pushrod which activates the slide valve member, a further feature being that inclined surfaces are arranged between a bell-shaped member of the eddy-current system and the slide valve member, which are constructed as a one-way claw clutch, and roller bearings are arranged between the inclined surfaces still another feature of the present disclosure being the provision of a bearing member between the bell-shaped member of the eddy-current system and the slide valve member.

---

Figure 1:
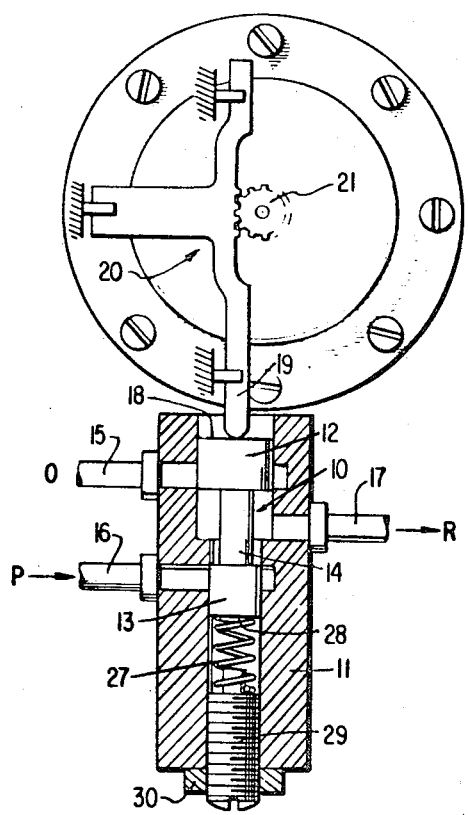

The present invention relates to a pressure control slide valve assembly, utilizable especially for automatically shifted motor vehicle transmissions, for producing a controlled pressure dependent on the rotational speed with the aid of a throttling edge at the slide valve which is acted upon, on the one hand, by the control pressure itself and, on the other, by a force depending on the rotational speed.

With the known valve systems of the type described above there exists oftentimes the desire to create an exact linear dependency of the pressure on the rotational speed. This is particularly important, for example, with automatically shifted motor vehicle transmissions as in such transmissions this pressure releases or triggers control pulses for the shifting operations. One has used heretofore but that purpose with motor vehicle transmissions hydraulic centrifugal governors which, however, produce a square-law pressure dependency. One then utilizes in general only portions of the pressure-rotational speed curve and connects several devices in series. Mechanical centrifugal governors are linearized by special and for the most part very complicated measures which, however, is successful for the most part with at least some accuracy only for very small rotational speed ranges. This again did not suffice for the large rotational speed variations of modern motor vehicle engines. The by-passing of these difficulties by stepped pressure controllers or transmitters is—viewed technically—at best an emergency solution and in the practical realization under no circumstances simpler.

The present invention aims at eliminating the aforementioned disadvantages. The present invention solves the underlying problems in that with the slide valve structures of the type described hereinabove, for producing a linear dependency of the pressure on the rotational speed, the slide valve member is acted upon by the torque of an eddy-current system.

The torque at the secondary part of these conventional eddy-current systems is exactly linear to the rotational speed of the primary part over a relatively very large range. Only in proximity of the saturating point of the material no linearity exists any longer. This point, however, lies at least with some known materials very high. Consequently, a pressure control slide valve assembly of simplest construction results from the present invention which assures over a sufficiently large rotational speed range an accurate linear dependence of the controlled pressure, without requiring special measures therefor.

In many cases it is further desired to maintain at all times a minimum pressure or to permit the slide valve member to respond with linear pressure increase only with a predetermined rotational speed. For the first-mentioned case, the present invention proposes that for purposes of producing a minimum pressure at the slide valve, a spring force be provided which acts in the same direction as the torque. For the latter case, a spring force may be provided at the slide valve member directed opposite to the torque for purposes of assuring a response only above a minimum rotational speed. In both cases, of course, an adjustability of the spring is within the purview of the present invention which can be realized manually—possibly only in the sense of a calibration of readjustment—or also automatically by conventional means.

The transmission of the torque from the eddy-current system to the slide valve can take place, in principle, in any desired manner, for example, also by the additional use of conventional transmissions or known servo-shifting members.

A particularly simple construction of the present invention essentially consists in that a gear drive consisting of pinion and toothed rack is operatively associated with or coordinated to the secondary part of the eddy-current system, which is construction in a bell-shaped manner, and in that the toothed rack, longitudinally movable within the housing, abuts against the end face of a partial piston or spool of the slide valve member.

In that case this slide valve member consists of two partial pistons of different sizes and connected with one another whose larger partial piston controls the discharge connection and whose smaller partial piston controls the pressure connection, the connection for the controlled pressure being disposed between the two partial pistons or spools, whereby the toothed rack abuts with a finger-like extension against the end surface of the larger partial piston. No spring force is necessary, as such, for proper operation of such a control system. However, insofar as the minimum values described above are to be maintained, a compression spring may be arranged either at the end face of the small partial piston (minimum rotational speed responsiveness) or of the larger partial piston (minimum pressure).

With the relatively small adjusting forces of the eddy-current system it may be important to eliminate the frictional losses as much as possible. In that connection the present invention proposes that the slide valve member itself or a sleeve surrounding the same is set into rotation whereby the engagement of the spring or of the toothed rack can take place by way of an axial bearing.

It is obvious that with the systems of the present invention, it is extremely desirable to reduce far-reachingly the friction at the transmission members between the eddy-current system and the slide valve structure and at the same time to enable a feed back or reaction of pressure fluctuations at the slide valve on the system with as little inertia as possible.

These aims are solved in accordance with a further feature of the present invention in that for purposes of converting the torque of the bell-shaped member of the eddy-current system into an axially effective adjusting force at the slide valve, inclined surfaces of conventional configuration are arranged between the bell-shaped secondary member and the slide valve member which are constructed approximately in the manner of one-way clutch claws and roller bodies are arranged between the same. Balls are used thereby primarily as roller bodies. It will be appropriate to provide three inclined surfaces at a type of claw clutch whose one part is securely arranged in the housing and whose other part is connected with the bell-shaped secondary member and the transmission element to the slide valve member.

This construction in accordance with the present invention offers the advantage that with the transmission of the small force of the eddy-current system to the slide valve, the friction can be eliminated far-reachingly. Furthermore, with the selection of the inclination at the inclined surfaces one has the possibility to vary completely at will the path and force at the slide valve. One may thereby attain also practically any desired curve and slope of the control characteristics whereby one can already vary the linearity range by a variation of the magnetization of the eddy-current system.

The present invention may be further improved in that a spring element is inserted within the force transmitting connection between the bell-shaped secondary member and the slide valve. Both the construction of the spring as well as the place of its arrangement are, as such, without significance. Thus for example, the insertion of a compression spring in a push rod serving as transmission member is possible as also the arrangement of compression or draw springs between the rotatable bell-shaped member and a lever serving as transmission element or even the slide member itself. The construction according to the present invention offers the advantage that pressure fluctuations at the slide valve are at first absorbed by the spring so that the movement of the slide valve is not impaired by the bell-shaped element having a relatively large inertia.

Additionally, the present invention proposes to support the bell-shaped member by a means of bearing separate from the bearing support of the transmission element disposed between the same and the slide valve. It is achieved thereby that the weight of the bell-shaped member no longer acts on the transmission element so that the latter can be supported more readily and with smaller friction. The bearing support of the bell-shaped member may take place in the housing or with respect to the rotating magnet part of the eddy-current system. In the former case, the bearing friction is effective in a pressure reducing manner whereas in the latter case in a pressure increasing manner.

With a preferred construction according to the present invention, a push rod is provided as transmission element which, on the one hand, engages at the slide valve and, on the other, is connected with one of the two parts forming the inclined surfaces and which is supported both at the slide valve as well as at the other of the two parts forming the inclined surfaces by suitable antifriction bearings. The usual bearing metal or also a plastic material, for example, Teflon, may be used for the antifriction bearings. Also the use of sintered metal for these bearings is within the scope of the present invention. It may be mentioned additionally that a tubularly shaped sleeve is provided for the drive of the magnet part of the system through which extends the push rod.

The push rod may engage in the slide valve member in the manner of a point support. However, the present invention prefers an arrangement according to which the push rod is supported at a ball, which is arranged within a central aperture of the slide valve member. No transverse forces become thereby effective on the radial bearing of the push rod in the slide valve member.

According to the present invention, the bell-shaped member may be arranged centrally on and non-rotatably with respect to the transmission element and the one part forming the inclined surfaces. However, a solution is preferred according to which the transmission element is rigidly connected with one of the parts forming the inclined surfaces which, in turn, is operatively connected with the bell-shaped member by a spiral spring. The bell-shaped secondary member is thereby centrally flanged over and is supported with the flanged over rim by way of a roller bearing in the sleeve of the drive means driving the magnet.

The drive of the aforementioned tubularly shaped sleeve takes place by way of a worm drive from the drive shaft of the transmission or any other shaft rotating in dependence on the vehicle speed. This worm drive may thereby also be disposed between the slide valve and the eddy-current system. The push rod has in this case play with respect to the sleeve. Additionally, the slide valve itself may be disposed between the worm gear and the eddy-current system. The sleeve then forms appropriately at the same time the cylinder for the slide valve.

Accordingly, it is an object of the present invention to provide a pressure control system, especially for automatically shifted motor vehicle transmissions, which obviates by simple and operationally reliable means the shortcomings and drawbacks encountered with the prior art systems, particularly as regards non-linearity between resulting controlled pressure and rotational speed thereof.

Another object of the present invention resides in the provision of a control system for controlling the pressure in dependence on the rotational speed, particularly for automatically shifted motor vehicle transmissions, which is simple in construction yet assures an accurate linear interdependence between the rotational speed and the resulting pressure over a relatively wide speed range, sufficiently large for normal motor vehicle engines.

A further object of the present invention resides in the provision of a pressure control device for producing a pressure dependent on the rotational speed, particularly for automatically shifted motor vehicle transmissions, which obviates the need of several series connected devices, eliminates complicated measures for linearizing mechanical centrifugal governors yet is operable with great accuracy over a wide range of rotational speed.

Still another object of the present invention resides in the provision of a pressure control system, especially for automatically shifted motor vehicle transmissions which assures linearity between rotational speed and resulting pressure yet permits, by simple means, the maintenance of minimum pressure or delay of responsiveness of the system until a predetermined rotational speed is reached.

A still further object of the present invention resides in the provision of a pressure control system of the type described above which reduces frictional losses in a far-reaching manner.

Another object of the present invention resides in the provision of a pressure control slide valve structure especially for automatically shifted motor vehicle transmissions, in which pressure fluctuations at the slide valve can be transmitted back to the system as free from inertia as possible.

Still another object of the present invention resides in the provision of a pressure control system for controlling the pressure in dependence on rotational speed, especially for automatically shifted motor vehicle transmissions, which not only assures complete linear interdependency but accurately reflects in the resulting pressure even small changes in the rotational speed by the substantial elimination of frictional losses in the transmission system.

A further object of the present invention resides in the provision of a pressure control system of a type described above in which the unimpeded movement of the slide valve is assured notwithstanding the presence of elements connected therewith that normally possess substantial inertia.

Another object of the present invention resides in the provision of a pressure control system for controlling the pressure lineally as a function of the rotational speed in which transverse forces acting on the radial bearings of the transmission elements in the slide valve are eliminated.

Figure 3:
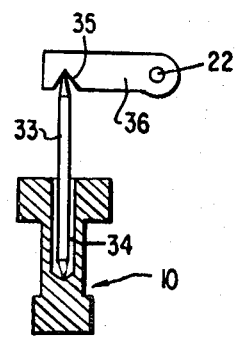
Figure 2:
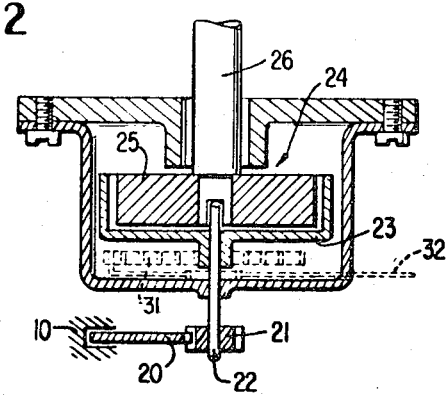

These and other objects, features, and advantages of the present invention will become more obvious from the following description when taken in connection with the accompanying drawing which shows, for purposes of illustration only, several embodiments in accordance with the present invention, and wherein:

FIGURE 1 is a somewhat schematic elevational view, partially in cross section, through a valve system in accordance with the present invention, FIGURE 2 is an axial cross-sectional view through the eddy-current system of FIGURE 1, FIGURE 3 is a partial cross-sectional view of a detail of a modified embodiment in accordance with the present invention, FIGURE 4 is an axial cross-sectional view through a modified embodiment of a pressure control valve structure in accordance with the present invention.

FIGURE 5 is a schematic view of the inclined surface arrangement used with the present invention, developed into the plane of the drawing, and FIGURE 6 is an axial cross-sectional view through still a further modified embodiment of a pressure control slide valve structure in accordance with the present invention.

Referring now to the drawing wherein like reference numerals designate like parts throughout the various views, and more particularly to FIGURES 1 and 2, reference numeral 10 generally designates the slide valve supported in housing 11 for longitudinal sliding movement relative thereto. The slide valve 10 consists of a large partial piston or spool 12 and of a small partial piston or spool 13 which are rigidly connected with each other by a piston rod 14. The large partial piston 12 controls the discharge connection 15 whereas the small partial piston 13 controls the pressure connection 16 which is in communication with one or several pressure producing pumps or tanks. The connection 17 for the controlled pressure is disposed between the two partial pistons 12 and 13.

The finger-like extension 19 of a toothed rack generally designated by reference numeral 20 acts against the end surface 18 of the large partial piston 12. The toothed rack 20 which cooperates with a pinion 21 forms together therewith a gear drive. The toothed rack 20 is supported in housing 11 as friction-free as possible and longitudinally movable, as schematically indicated in the drawing. The pinion 21 is secured on the shaft 22 of the bell-shaped secondary part 23 of a conventional eddy-current system generally designated by reference numeral 24 (FIGURE 2). The magnet armature 25 which is arranged within the bell-shaped part 23, is connected for rotation in unison with the drive shaft 26—which may be the tachometer shaft or may be operatively connected therewith—and forms the primary part of the eddy-current system. The shaft 22 of the secondary part 23 is suitably supported in the primary part 25.

A compression spring 27 is coordinated to the pressure control slide valve 10 which acts, on the one hand, against the end face 28 of the smaller partial piston 13 and abuts, on the other, against a treaded plug 29 as counter-abutment. The plug 29 is adapted to be adjusted within housing 11 with the aid of a counter nut 30. The spring force of spring 27 thus acts against the torque exerted by the toothed rack 20 and therewith by the eddy-current system corresponding to the rotational speed. Consequently, the spring 27 keeps the pressure connection 16 closed for such length of time (control pressure=zero) until the torque at the eddy-current system 24 has reached a predetermined value. This means that the rotational speed has to attain first a predetermined value in order to produce a control pressure. However, the spring 27 could also be replaced by a flexing or bending or spiral spring 31 whose one end is connected with the end of the bell-shaped member 23 and whose other end is connected with an adjustable lever 32 (or with a gear wheel or the like) as indicated in dash line in FIGURE 2. If so desired, another control magnitude may act also against or engage with this lever 32.

If the force conditioned by the spring 27 or 31 is exceeded by a torque of the eddy-current system corresponding to a predetermined rotational speed, then the slide valve 10 is displaced downwardly against its compression spring 27 until the small partial piston 13 releases with its control edge 31 the pressure connection 16. A throttling of the pressure now occurs at this place and a controlled pressure builds up in the connection 17 whose magnitude corresponds to the torque of the eddy-current system 24 and therewith to the rotational speed. If the torque increases, that is, the rotational speed also increases, then also the controlled pressure increases lineally which acts on the differential surface between the two partial pistons 12 and 13 and therewith holds in balance the torque of the eddy-current system. If the rotational speed decreases, then the controlled pressure pushes the slide valve 10 back to such an extent until again an equilibrium condition prevails. The same operation also occurs if with constant rotational speed, that is, constant torque, the controlled pressure should fluctuate for any reason. Consequently, the controlled pressure is automatically adjusted to a value corresponding to the prevailing torque.

The torque at the eddy-current system 24 varies exactly lineally with the rotational speed of the drive shaft 26 which may also be directly connected with the drive or output shaft of the motor vehicle. Since the lever arm remains constant at the gear drive, the force at the finger-like extension 19 of the toothed rack may be equated to the torque. In order to achieve a sufficient adjusting force, the gear drive may be chosen itself accordingly or transmission elements or servo-actuating elements of conventional construction may be interconnected.

With automatically shifted motor vehicle transmissions, the maintenance of a predetermined minimum pressure is oftentimes important. For that case, the compression spring 27 illustrated in FIG. 1 is arranged on the other side of the slide valve 10. The spring 27 is then disposed concentrically to the finger-like extension 19 of the toothed rack 20 and acts against the end face 18 of the large partial piston 12 in the same direction as the toothed rack 20. The counter-abutment for the spring and also the adjusting plug will then be constructed correspondingly. A compression spring arranged in such manner maintains independently of the torque of the eddy-current system 24 always a minimum pressure in the control system, i.e., in the connection 17, corresponding to the spring force. Even when the torque at the eddy-current system 24 has a zero value, the control pressure maintains its minimum value. If the torque increases, then the control pressure is again varied in exactly linear interdependence on the rotational speed.

According to FIGURE 3, the force transmission between the eddy-current system 24 and the slide valve 10 takes place by a rod 33 which terminates at both ends in points. The rod 33 engages, on the one hand, in a central bore 34 of the slide valve and, on the other, in a groove or keyway 35 of a lever 36 which is secured to the shaft 22 of the bell-shaped member 23 of the eddy-current system 24. In this manner there is produced a knife edge bearing operating almost completely without friction. The point of engagement of the rod 33 at the slide valve 10 is thereby disposed appropriately in the center of gravity or in the vicinity thereof. Since the paths at the slide valve are extremely small, the rod 33 remains practically parallel to itself.

In the embodiment of FIGURE 4, a conventional eddy-current system generally designated by reference numeral 111 is arranged within the housing 110. The magnet 112 of this system 111 is driven by way of a tubularly shaped sleeve 113 and a worm drive generally designated by reference numeral 114 from the transmission output shaft of the vehicle. A push rod 115 is arranged with play within the sleeve 113 which, on the one hand, is rigidly connected with the secondary bell-shaped member 116 of the eddy-current system 111 and, on the other hand, engages in a slide valve piston generally designated by reference numeral 117 which, in turn, is arranged within a bore 118 of the housing 110. The push rod 115 serves as transmission element from the eddy-current system 111 to the slide valve 117.

The bell-shaped element 116 of the eddy-current system 111 carries centrally one part 119 of a shifting device generally designated by reference numeral 120 and constructed in the manner of a one-way claw clutch whose other part 121 is arranged securely with the housing 110. This arrangement 120 serves the purpose to produce from the rotational movement of the bell-shaped member 116 an axial movement at the push rod 115 and therewith at the slide valve 117. The arrangement 120 has, as may be seen in particular from FIGURE 5, inclined surfaces 122 at both parts 119 and 121 thereof. Balls 123 as roller bodies are disposed between these inclined surfaces 122. The number of pairs of inclined surfaces 122 and balls 123 may be selected at will, in the instant case amounts to three.

The push rod 115 is supported by means of a slide bearing 124, for example of Teflon, within the fixed part 121 of the one-way clutch arrangement 120. The push rod 115 engages with a point 125 in the slide valve 117 and is supported thereat also by means of a slide bearing 126.

The slide valve 117 may be constructed in any known conventional manner. It controls with its control edges 127 the supply 128 and discharge connection 129 so that, depending on its position, the controlled pressure builds up in a conventional manner within the connection 130. This pressure also acts through bore 131 on the end face 132 of the slide valve 117.

A torque is exerted on the bell-shaped member 116 of the eddy-current system 111 corresponding to the driving velocity of the vehicle. The rotation of the bell-shaped member 116 is converted through the shifting arrangement 120 into an axial movement of the push rod 115. The slide valve 117 with its control edges 127 is thereby displaced from the illustrated position thereof, for example, further to the right so that a pressure can build up within the connection 130 which is proportional to the torque at the bell-shaped member 116. The torque has a linear relation with the driving rotational speed of the vehicle so that also the pressure depends linearly from the vehicle driving speed.

According to FIGURE 6, the bell-shaped member 133 of the eddy-current system 111 constructed in principle like the eddy-current system 111 of FIGURE 4 is supported inwardly thereof by means of a roller bearing 134 within the sleeve 135 which again serves as drive for the magnet 112 of the eddy-current system 111.

The sleeve 135 serves in this case at the same time as cylinder for the accommodation of the slide valve member 117. The sleeve 135 also contains the control apertures 136 for the slide valve member 117. The push rod 115 is constructed planar or flat at the end thereof and is supported on a ball 137 within an aperture 138 of the slide valve member 117. A radial bearing may also be provided with this embodiment as in FIGURE 4.

The shifting mechanism 120 is constructed, in principle, identically with that of FIGURE 4. A spiral spring 140 is secured by means of an arm 139 at the part 119 of the shifting mechanism 120 which part 119 is connected for rotation in unison with the push rod 115. On the other hand, the other end of the spiral spring 140 is secured at an arm 141 of the bell-shaped member 133. The torque of the bell-shaped member 133 is, therefore, transmitted by way of the spring 140 to the shifting mechanism 120 and therewith to the push rod 115. It is achieved thereby that a pressure fluctuation at the slide valve 117 is initially absorbed by the spring 140 and is not delayed by the relatively heavy bell-shaped member 133. In other respects, the pressure-responsive operation of slide valve 117 is similar to the embodiment according to FIGURE 4, described above.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:
1. A pressure control valve assembly, especially for automatically shifted motor vehicle transmissions, for producing a controlled pressure depending substantially on the rotational speed with the aid of a throttling edge at the slide valve, comprising:
   a slide valve structure including housing means and piston means forming a throttling edge, said housing means and piston means being movable relative to one another,
   means for actuating said piston means by the controlled pressure,
   and further means acting upon said piston means for producing a substantially linear dependency of the controlled pressure on the rotational speed including eddy-current means and transmitting means for actuating said piston means by the torque of said eddy-current means,
   said eddy-current motor means including a primary part and a secondary part,
   means for setting into rotation one of the two parts consisting of said piston means and said housing means, and means operatively connecting the rotating part with said transmitting means by way of axial bearings.
2. The combination according to claim 1, wherein said rotating part is a sleeve-like element surrounding said piston means.
3. A pressure control valve assembly, especially for automatically shifted motor vehicle transmissions, for producing a controlled pressure depending on the rotational speed of a rotating part, comprising:
   slide valve means,
   and control means acting upon said slide valve means for controlling the pressure substantially linearly in dependence on the rotational speed including eddy-current means producing a torque whose magnitude varies substantially linearly with variations in said rotational speed and further means for applying the torque of said eddy-current means to said slide valve means,
   said eddy-current means including a primary part and a secondary part,
   and said transmitting means including push rod means, and means for converting the rotational movement of said secondary part into axial movement of said push rod means, said converting means being constructed in the manner of a one-way claw clutch and including inclined surface means and roller body means between said inclined surface means.

4. The combination according to claim 3, wherein said transmission means includes a push rod engaging, on the one hand, at said slide valve means and, on the other, operatively connected with one of the two parts constituting one of said inclined surface means, and means including sliding bearing means for supporting said push rod in said slide valve means as well as in the other of the two parts constituting the other of said inclined surface means.

5. The combination according to claim 4, further comprising a ball provided within a central aperture of the slide valve means, and said push rod being supported on said ball.

6. The combination according to claim 3 wherein said secondary part is bell-shaped and is arranged for rotation in unison with said transmitting means and on the one of the two parts constituting said inclined surface means.

7. The combination according to claim 3, wherein said transmitting means is rigidly connected with one of the two parts constituting said inclined surface means which, in turn, is operatively connected with said secondary part by way of spiral spring means.

8. The combination according to claim 7, wherein said secondary part is of substantially bell shape with a flanged portion at the center thereof, drive means including sleeve means for driving the primary part of the eddy-current means, and roller bearing means for supporting the flanged rim of the bell shaped secondary part in said sleeve means.

9. A pressure control valve assembly, especially for automatically shifted motor vehicle transmissions, for producing a controlled pressure depending substantially on the rotational speed with the aid of a throttling edge at the slide valve, comprising:
- a slide valve structure including housing means and piston means forming a throttling edge, said housing means and piston means being movable relative to one another,
- means for actuating said piston means by the controlled pressure,
- and further means acting upon said piston means for producing a substantially linear dependency of the controlled pressure on the rotational speed including eddy-current means and means for actuating said piston means by the torque of said eddy-current means,
- said eddy current motor means including a primary part and a secondary part,
- and said transmitting means including push rod means, and means for converting the rotational movement of said secondary part into axial movement of said push rod means, said converting means being constructed in the manner of a one-way claw clutch and including inclined surface means and roller body means between said inclined surface means.

10. The combination according to claim 9, wherein said push rod means engages, on the one hand, at said slide valve means and, on the other, is operatively connected with one of the two parts constituting said inclined surface means, and means including sliding bearing means for supporting said push rod means in said slide valve means as well as in the other of said two parts constituting said inclined surface means.

11. The combination according to claim 9, further comprising a ball provided within a central aperture of the slide valve means, and said push rod means being supported on said ball.

12. The combination according to claim 9, wherein said secondary part is arranged for rotation in unison with said transmission means and with one of the two parts constituting said inclined surface means.

13. The combination according to claim 9, wherein said transmitting means is rigidly connected with one of the two parts constituting said inclined surface means which, in turn, is operatively connected with said secondary part by way of spiral spring means.

14. The combination according to claim 9, wherein said secondary part is of substantially bell shape with a flanged portion at the center thereof, drive means including sleeve means for driving the primary part of the eddy-current means, and roller bearing means for supporting the flanged rim of the bell-shaped secondary part in said sleeve means.

15. A pressure control valve assembly, especially for automatically shifted motor vehicle transmissions, for producing a controlled pressure depending substantially on the rotational speed with the aid of a throttling edge at the slide valve, comprising:
- a slide valve structure including housing means and piston means forming a throttling edge, said housing means and piston means being movable relative to one another,
- means for actuating said piston means by the controlled pressure, and
- further means acting upon said piston means for producing a substantially linear dependency of the controlled pressure on the rotational speed including eddy-current means and means for actuating said piston means by the torque of said eddy-current means,
- said eddy-current motor means including a primary part and a secondary part,
- and said transmitting means including push rod means, and means for converting the rotational movement of said secondary part into axial movement of said push rod means, said converting means being constructed in the manner of a one-way claw clutch and including inclined surface means and roller body means between said inclined surface means,
- and spring means interposed in said transmission means between the secondary part and said piston means.

16. A pressure control valve assembly, especially for automatically shifted motor vehicle transmissions, for producing a controlled pressure depending substantially on the rotational speed with the aid of a throttling edge at the slide valve, comprising:
- a slide valve structure including housing means and piston means forming a throttling edge, said housing means and piston means being movable relative to one another,
- means for actuating said piston means by the controlled pressure,
- and further means acting upon said piston means for producing a substantially linear dependency of the controlled pressure on the rotational speed including eddy-current means and means for actuating said piston means by the torque of said eddy-current means,
- said eddy-current motor means including a primary part and a second part,
- and said transmitting means including push rod means, and means for converting the rotational movement of said secondary part into axial movement of said push rod means, said converting means being constructed in the manner of a one-way claw clutch and including inclined surface means and roller body means between said inclined surface means,
- and spring means interposed in said transmission means between the secondary part and said piston means,
- and bearing means for supporting said secondary part separate from the bearing support of the transmission means disposed between said secondary part and said slide valve means.

References Cited

UNITED STATES PATENTS

| | | | |
|---|---|---|---|
| 647,791 | 4/1900 | Armor | 73—519 |
| 2,263,264 | 11/1941 | Duwe | 73—519 |
| 2,364,810 | 12/1944 | Noxon | 137—30 X |
| 3,240,218 | 3/1966 | Dalder | 137—47 |

FOREIGN PATENTS

| | | |
|---|---|---|
| 759,583 | 10/1956 | Great Britain. |
| 808,457 | 2/1959 | Great Britain. |

CLARENCE R. GORDON, *Primary Examiner.*

U.S. Cl. X.R.

73—519; 251—86, 250, 257